United States Patent [19]
Mintzer et al.

[11] Patent Number: 5,875,249
[45] Date of Patent: Feb. 23, 1999

[54] INVISIBLE IMAGE WATERMARK FOR IMAGE VERIFICATION

[75] Inventors: Frederick Cole Mintzer, Shrub Oak; Minerva Ming-Yee Yeung, Yorktown Heights, both of N.Y.

[73] Assignee: International Business Machines Corporation, Armonk, N.Y.

[21] Appl. No.: 780,484

[22] Filed: Jan. 8, 1997

[51] Int. Cl.$^6$ .................................................. G09C 5/00
[52] U.S. Cl. .................................... 380/54; 380/3; 380/4; 380/23; 380/55; 283/17; 283/73; 283/113
[58] Field of Search .................................. 382/232, 115, 382/252, 280, 287, 248, 250; 380/3–5, 51, 55, 4, 9, 10, 21, 23, 25, 44, 45, 46, 47, 49, 50, 54, 59; 283/17, 113, 901, 902, 73; 355/79

[56] References Cited

U.S. PATENT DOCUMENTS

| 5,488,664 | 1/1996 | Shamir | 380/54 |
| 5,530,759 | 6/1996 | Braudaway et al. | 380/54 |
| 5,664,018 | 9/1997 | Leighton | 380/54 |
| 5,734,752 | 3/1998 | Knox | 380/54 X |
| 5,745,569 | 4/1998 | Moskowitz et al. | 380/4 |
| 5,748,783 | 5/1998 | Rhoads | 380/4 X |

OTHER PUBLICATIONS van Schyndel, R. G. et al., "A Digital Watermark", IEEE, vol. II of III, pp. 86–90, 1994.

Walton, Steve, "Image Authentication for a Slippery New Age", Dr. Dobb's Journal, pp. 18–20, 22, 24, 26, 82, 84–87, vol. 20, Issue 4, Apr. 1995.

Friedman, Gary L., "The Trustworthy Digital Camera: Restoring Credibility to the Photographic Image", IEEE, pp. 905–910, 1993.

Bender, W. et al., "Techniques for data hiding", IBM Systems Journal, vol. 35, Nos. 3&4, pp. 313–336, 1996.

*Primary Examiner*—Bernarr E. Gregory
*Attorney, Agent, or Firm*—Ratner & Prestia

[57] ABSTRACT

A system quickly verifies that the content of an image has not been changed since an earlier time when the content of that image was stamped. The system consists of a stamping process that embeds stamping information into a source image and produces a verification key, and a verification process that extracts stamping information from a stamped source image based on the verification key. Furthermore, the verification process produces an image itself, from which the verification can be readily judged visually or by use of a computer or other display device. In the verification process, the changes in an image can be detected and localized. The image stamping process further includes an error diffusion process so that the effects of combining the stamping information with the original image are not readily perceptable. An image is safeguarded against malicious manipulations and the proprietary rights are protected by maintaining the integrity of the image content.

28 Claims, 12 Drawing Sheets

INVISIBLE IMAGE WATERMARK FOR IMAGE VERIFICATION

FIELD OF THE INVENTION

The invention relates to the field of digital imaging and more particularly to the fields of multimedia object security and image watermarking.

BACKGROUND OF THE INVENTION

The field of digital image verification and protection, including verifying and protecting the integrity of digital images stored in memory for authentication and security purposes, has recently gained importance and wide recognition.

Several areas of research have been initiated in this field. One area of research focused on a "Trustworthy Digital Camera" in which a watermarking scheme was incorporated into an image to determine whether a digital photo had been modified, and the watermarking process included using existing public-key encryption technology. Another area of research studied coding undetectable digital signatures onto an image by the bit plane manipulation of least significant bit (LSB), as well as applying linear addition of the watermark to the image data using m-sequences. Other techniques hide simple data in images by embedding one bit of data in a host image using statistical approach (Patchwork), as well as using blocks of random textures to replace those regions of similar textures to create an identical pair of textured regions upon which the shape was recovered by auto-correlation measures (Texture Block Coding). Also, other research includes techniques to embed long strings of binary bits, called "digital seals" to a set of randomly generated addresses where the LSB of pixels were changed to match the corresponding bit in the string.

In many of the above techniques, the information is "stamped" into the LSB of the pixel values in the image. This stamping technique is unlikely to cause visual artifacts in the image. If an image is altered, the LSB is most likely to be changed such that the verification will be able to determine the modification. However, such LSB manipulation is not secure against malicious attacks: it is relatively easy to create a system to change the content of an image without changing the LSB of every pixel value, in fact, the whole image can be replaced, but as long as the LSB of every pixel is maintained as the original source image, the verification process is not able to detect such alterations. Another drawback of many existing techniques is that they are not able to determine the regions of modification in the verification process. The verification process will only be able to determine if the image is modified or not, but not able to locate where the alterations have taken place. Such information may be valuable for better security measures.

At one extreme, one stamping process is one in which the stamping process is null, and the information stamped into the image (the "stamping information") is the image itself. The verification process would then also be null and the extracted stamping information would be the stamped source image itself. The final comparison of the stamping information and the stamping information extracted would then effectively be a comparison of the source image known at stamping time with the source image known at verification time. This comparison is not very efficient, however, as the stamping information is quite large and requires considerable memory to store the information. Similarly, considerable bandwidth is required to transmit the information. This leads us to one desired property of the verification process is the amount of stamping information be quite small.

On the other hand, another stamping process is one that extracts a pixel from a predetermined location in the image and uses that pixel and its position as the stamping information. The verification process then determines whether this pixel was unchanged in the stamped image. While, in this case, the amount of stamping information is small, the certainty of correct verification is also low, since many different alterations of an image would not alter the single given pixel. Therefore, a second desired property of the verification process is that the verification process, with high likelihood, must be able to determine whether the stamped image has been modified since stamping.

In addition to image verification, digital watermarks have been proposed for copyright protection means. For example, in U.S. Pat. No. 5,530,759 entitled COLOR CORRECT DIGITAL WATERMARKING OF IMAGES, to G. W. Braudaway, K. A. Magerlein and F. C. Mintzer, a system for placing a visible "watermark" on an image is disclosed to discourage unauthorized use of the image. In U.S. Pat. No. 5,488,664, entitled METHOD AND APPARATUS FOR PROTECTING VISUAL INFORMATION WITH PRINTED CRYPTOGRAPHIC WATERMARKS, to A. Shamir, a method and device is disclosed for protecting visual information against unauthorized access and modification using a printed cryptographic "watermark" which is encoded using black and white pixels. These are examples of using "visible watermarks". The watermark itself is explicitly displayed and perceptually noticeable in the stamped image.

SUMMARY OF THE INVENTION

An image verification process verifies that the content of an image has not been changed since an earlier time when the content of that image was stamped. The image verification process receives a source image and stamping information, and embeds the stamping information into the source image to produce a stamped image. A key enables the information to be extracted from the stamped image. After the embeding process, the image verification process extracts the stamping information from the stamped image based on the key, and the stamped image is determined to be corrupted if the original stamping information does not match the extracted stamping information.

BRIEF DESCRIPTION OF THE DRAWINGS

These and other features and advantages of the present invention will become apparent from the following detailed description, taken in conjunction with the accompanying drawings, wherein.

DETAILED DESCRIPTION OF THE PREFERRED EMBODIMENT

Overview

Figure 1:
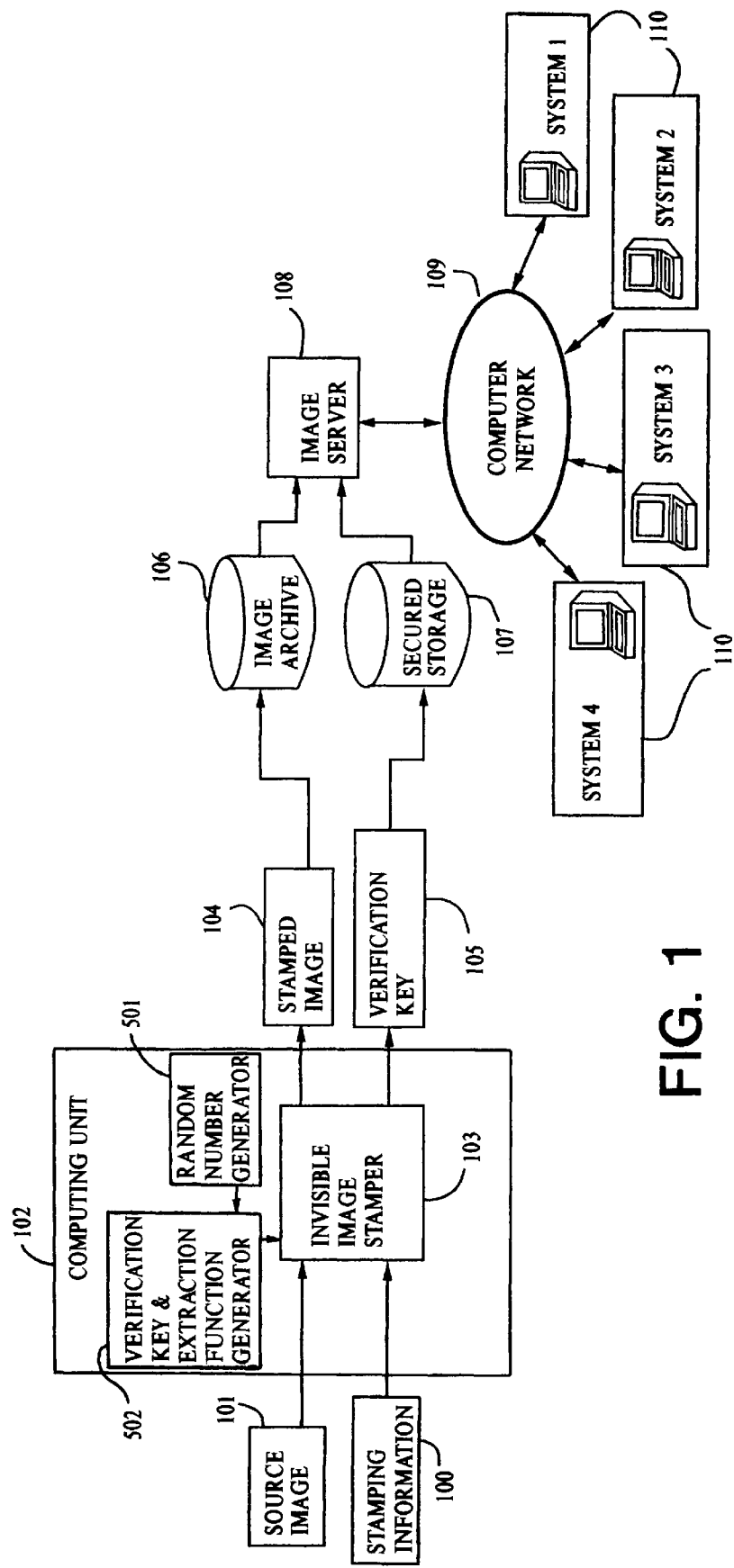
FIG. 1 is a block diagram of the system comprising the components of the invisible image stamping, image and verification key storage and distribution processes, which is suitable for use in accordance with an embodiment of the present invention.

The present invention relates to a system and a method to verify an image through an "invisible watermark" that is stamped onto an image for image content verification. The watermark consists of the stamping information, and the image stamping process combines the watermark with the source image values without generating any visible traces of the watermark or any visual artifacts in the image. In other words, the watermark is perceptually invisible. Because it is invisible, any modification on the image alters the watermark, but unlike visible features, the attacker cannot restore the altered invisible mark stamped onto the image. The content of an image can then be verified for authenticity. In addition, the watermark inserted, though invisible, can be later extracted to show the ownership information.

The system of the present invention quickly verifies that the content of an image has not been changed since an earlier time when the content of that image was stamped. The system consists of a stamping process that embeds digital information, called stamping information, into a source image based upon a defined mapping process to produce a stamped image. The mapping process is identified by a decoding "key" which allows a user to decode the stamping information from the stamped image, and this key is called a verification key. The system also includes a verification process that extracts stamping information from a stamped source image based upon the mapping process identified by the verification key. In one embodiment of the present invention, the stamping information is also information that defines a predetermined image, which is called a watermark image. This watermark image permits visual comparison of the stamping information extracted in the verification process with the stamping information applied in the stamping process. In another embodiment, this comparison may also be performed by computer algorithm. Finally, the stamping information can be displayed to show the proper ownership of an image which is stamped.

The present invention quickly verifies that the content of an image has not been changed by extracting the stamping information from the stamped image and comparing it with the information added when the image was stamped. If a match is obtained, the image is determined to not have been altered since it was stamped. The present invention also includes a system for embedding stamping information into the image values of a source image without causing any perceptable changes to the source image. Therefore, the stamping information can be easily and securely extracted for verification purposes with the proper verification key, and without the verification key the stamping information cannot be obtained.

In this embodiment of the invention, the process of embedding stamping information into the source image pixel values introduces errors and alters the pixel values. The errors introduced, however, do not cause visual quality degradation to the image as the errors are spread out locally by an error diffusion process. In addition, the stamping information is embedded by a combination of the source pixel values together with the errors introduced, and such information is hidden in various bit values beyond the least significant bit (LSB), such that the invention does not suffer the drawbacks of LSB manipulation and is more secure against attacks. Furthermore, the invention can determine and localize the regions of image alteration in the verification process.

The stamping information of the present invention can be in the form of any digital bit stream. In the preferred embodiment, an image that clearly depicts the ownership information in the form of trademarks and graphic symbols is used as the stamping information. Therefore, in the present invention, the stamping information is also an image, called a "watermark image." In the following descriptions, the term watermark image is equivalent to one form of stamping information, and so the terms are used interchangably.

a) Summary of Invisible Image Stamping Processing

In the invisible image stamping process, the watermark image, W(I,J) is embedded into the source image, S (I,J), to produce a stamped source image SS (I,J) (I and J integers locating a particular value in a matrix and representing, for example, Ith column and Jth row). Each pixel in the source image is processed in turn. The processing applies a watermark extraction function WX (*) to the selected pixel, and tests the extracted watermark value to determine whether it is equal to the value of the watermark to be embedded. If they are equal, the processing proceeds to the next pixel. If they are not equal, the value of the selected pixel is altered until the value of the extracted watermark is equal to the value of the watermark to be embedded, the change required to do this is calculated, and the negative of that change is propagated to pixels not yet processed using error diffusion. This process is repeated until every pixel in the source image has been stamped. A verification key is produced, together with the stamped image as the final products.

b) Summary of Image Verification Processing

In the image verification processing, a watermark image, EW(I,J), is extracted from a stamped source image, SS(I,J). This extraction begins by computing the watermark extraction function, WX(*), from the verification key, and applies the function to every pixel SS(I,J) to produce the watermark pixel EW(I,J). The watermark extraction process is repeated until every pixel in the stamped-source image has been processed. The result is an extracted watermark image. This image can be compared visually or numerically with the original watermark image to check for alterations and discrepancies in the stamped image.

c) Image Verification and Stamping on JPEG-Compressed Images

A digital image of high resolution may require a significant amount of storage space, and incurs higher transmission costs. It is likely that many of these images will be distributed in the compressed forms following the JPEG compression standard. Direct compression of images with the embedded stamping information, or, the watermarks, will destroy most of the watermarks, as the quantization process inherent in compression techniques alters most of the pixel values. In the preferred embodiment of our invention, a scheme is also provided to perform the invisible image stamping processing and image verification processing on images that are coded into JPEG compression data formats. The stamping information can be embedded directly into the existing JPEG compressed image data stream without full decompression of the image. Similarly, image verification can be done directly from JPEG compressed image without having to first decompress the compressed image entirely and then verify the content. The image verification and invisible stamping processing on compressed JPEG source image is achieved by extracting the dc coefficients in the JPEG image data stream to form a dc-coefficient image and applying the image verification and stamping processing on the dc-coefficient image. The stamped dc coefficients are then re-encoded into the compressed data stream conforming to the standard JPEG data format.

Error Diffusion

In the preferred embodiment, the image is stamped by introducing errors and then diffusing the errors introduced smoothly and locally. This diffusion is achieved by modifying and adapting the error diffusion process.

Error diffusion techniques for halftoning images are generally well known in the art. One technique is described by Robert Floyd and Louis Steinberg, as set forth in "An Adaptive Algorithm for Spatial Gray Scale," 1975 SID *International Symposium, Digest of Technical Papers*, pp 36–37. Many variations of error diffusion are also described in the book by R. Ulichney, *Digital Halftoning*, Cambridge, Mass., MIT Press, 1987.

Error diffusion begins with the diffused errors, $e_{ij}$, at each pixel position equal to zero. Mathematically, this is described as: $e_{ij}=0 \; \forall i,j$. The input pixels are processed in order, following the processing of a selected pixel at an initial or first pixel position, against which the diffused errors are determined, with the processing steps for each remaining pixel being:

1. The modified-pixel value, $mp_{ij}$, is computed as the sum of the input-pixel value, $ip_{ij}$, and the value of the diffused error at that pixel position. Mathematically, this is described as:

$$mp_{ij}=ip_{ij}e_{ij}.$$

2. The output-pixel value, $op_{ij}$, is selected as one of the possible output values, $q_r$, that is near the modified pixel value. Mathematically, this is described as:

$$op_{ij}=Q(mp_{ij})$$

where $Q(x)$ selects one the available output values, $q_r$, near x.

3. The quantization-error is now described by:

$$d_{ij}=mp_{ij}-op_{ij}.$$

4. At pixel positions not yet processed, the diffused errors are incremented by amounts that are proportional to the quantization-error at this pixel position described by:

$$e_{i+r,j+s}=e_{i+r,j+s}+c_{r,s}d_{ij}.$$

subject to $\Sigma c_{r,s}=\gamma$.

Many of the differences in the various error diffusion techniques are variations in the choices made for the diffusion coefficients, $c_{r,s}$, used above in step 4. For instance, in the above cited Floyd and Steinberg article the coefficients are constants, while an example of the use of random variable coefficients is found in U.S. Pat. No. 4,654,721, issued Mar 31, 1987 to Gerald Goertzel and Gerhard R. Thompson and entitled, "System for Reproducing Multi-Level Digital Images on a Bi-Level Printer of Fixed Dot Size", which is incorporated herein by reference.

The Image Verification System

FIG. 1 is a block diagram of the system for the invisible image stamping and image distribution processes which is suitable for use in accordance with an embodiment of the present invention. The flow of the invisible image stamping process, together with the storage and distribution system suitable for use in accordance with an embodiment of the present invention, are illustrated. In the invisible image stamper in block 103, the source image 101 and the stamping information 100 are combined to produce a stamped source image 104. A verification key 105 is also produced. The stamped source image 104 should appear perceptually to be nearly identical to the source image 101, although it has the stamping information 100 embedded in it. In other words, the stamping information is hidden invisibly and directly into the original image values. This stamping process is carried out in a digital computer 102. The invisible stamping process shown in block 103 is described in detail in the following sections and illustrated in FIGS. 5, 6 and 7.

The stamped images can be stored in a image archive 106, and subsequently can be retrieved by the image server 108. The verification keys are stored in a secured storage 107. The server controls and distributes the stamped images upon request, via the computer networks 109 which can be local-area networks or wide-area networks such as the Internet, to individual computer systems 110 connected to the network. The server 106 also controls the access to the verifications keys and distributes the proper key to the rightful client of any particular image. The stamping information can be extracted with the proper verification keys and displayed in the clients' computer systems.

a) Image Verification Processing

Figure 2:
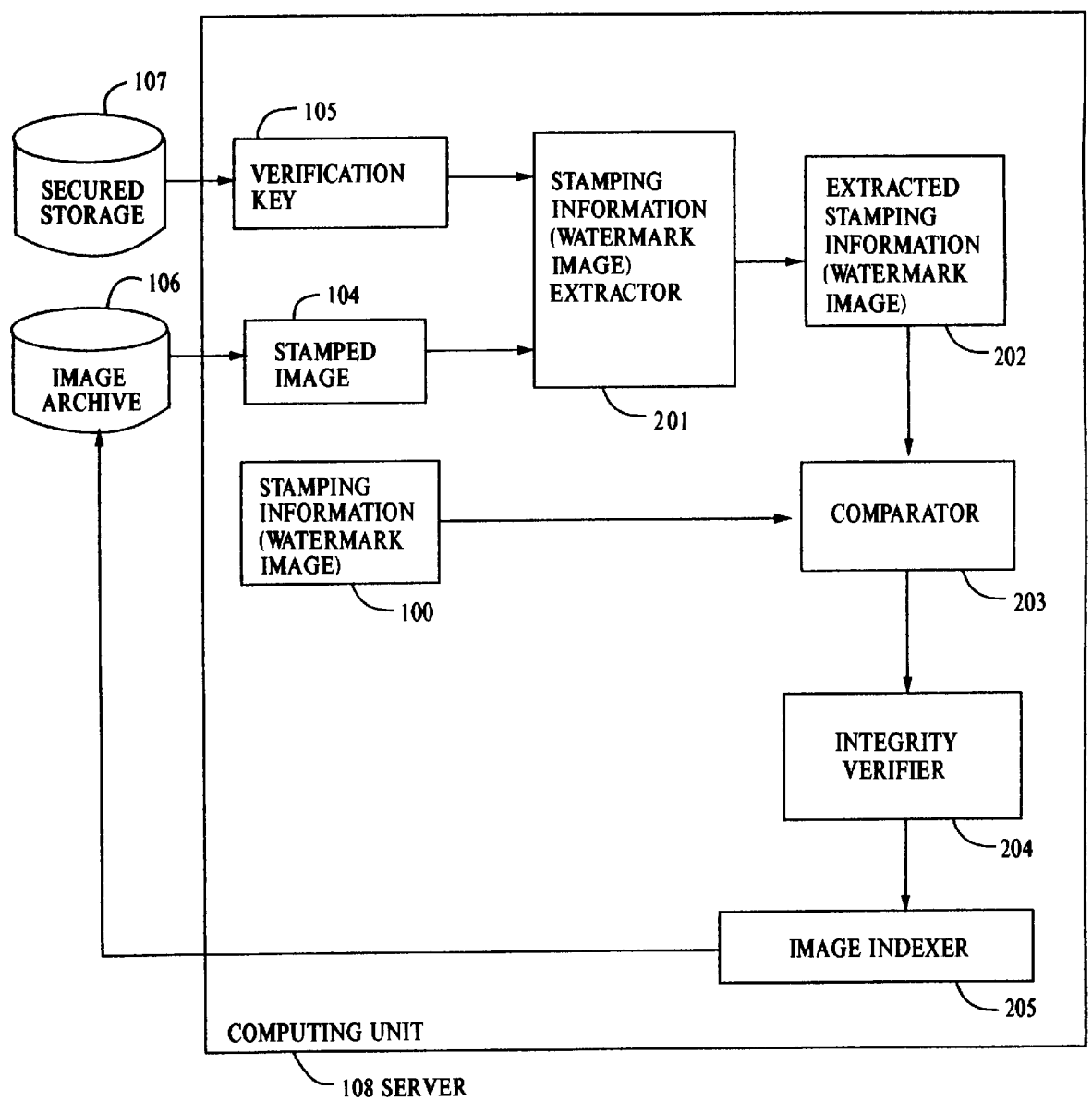
FIG. 2 is a block diagram showing the functional blocks of an embodiment of the image verification processing system in the server which controls the access and distributes the stamped images and verification keys.

FIG. 2 shows the functional level block diagram of the image verification process on the server system 108. The server 108 verifies the integrity of the image data stored in the archive 106. This verification is achieved by first selecting a stamped image 104 from the archive and obtaining the corresponding verification key 105 of the stamped image from the secured storage of the keys 107, and then reading the two pieces of information into the computing unit for processing. In the verification process, the stamped source image and the verification key are processed in block 201 to extract the stamping information embedded in the image. The extracted stamping information 202 and the stamping information 100 that is known to the server are then compared in block 203. When a match is obtained, the image is determined to not have been altered since it was stamped. The result of the verification is then used in block 204 to confirm the integrity of the content and take on appropriate actions if it is verified that the content has been altered. For the server, such actions may include alerting the system administration on possible abuse as well as restricting the access of images whose content integrity is under investigation. The server then updates the current image index in block 205 and goes on to select a new image for verification processing in a recursive manner.

Figure 3:
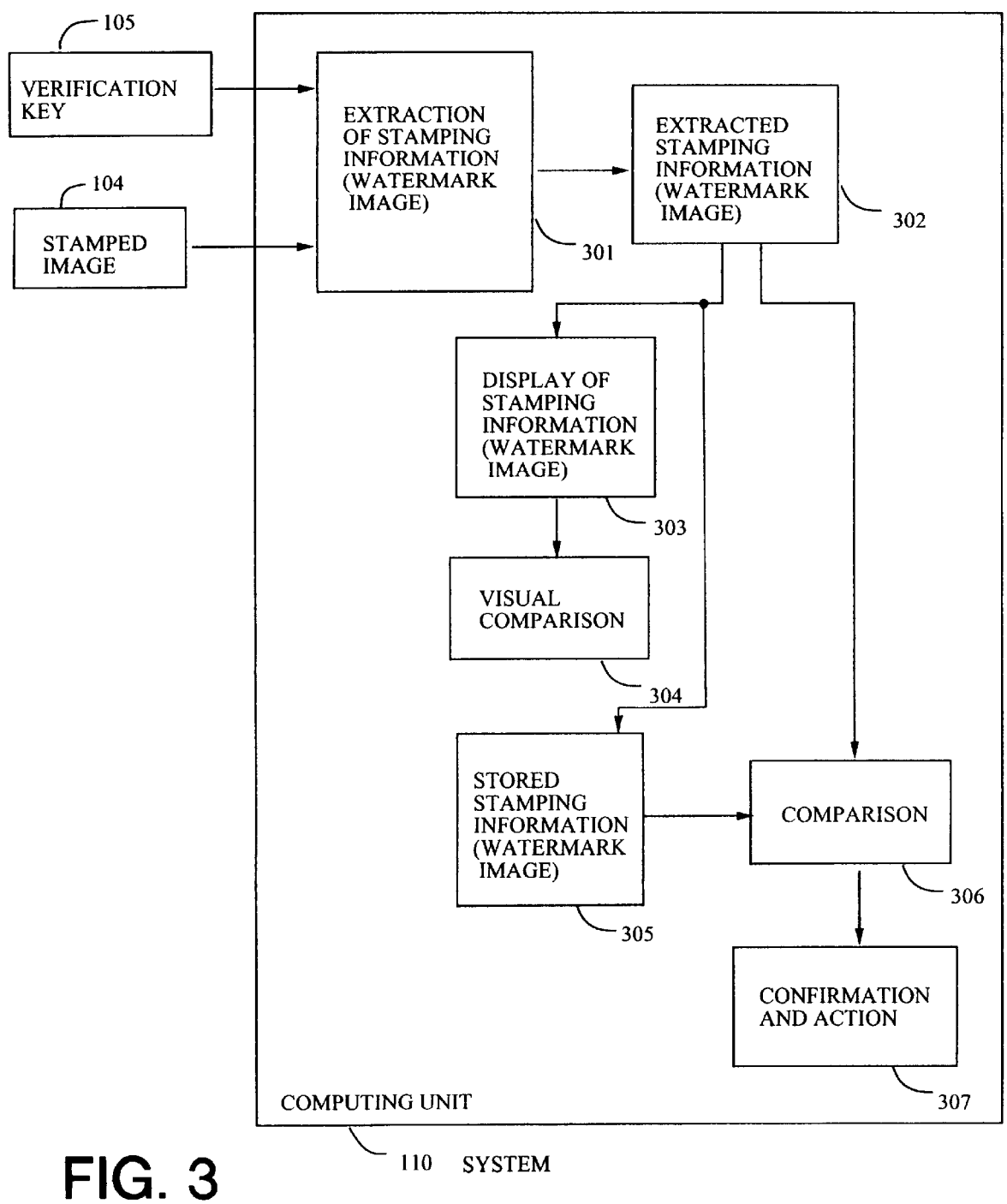
FIG. 3 is a block diagram showing the functional blocks of an embodiment of the image verification processing system in the client computer system which receives the stamped images and verification keys.

FIG. 3 shows the functional level block diagram of the image verification process on the client computer system 110. The verification process is similar to that in FIG. 2 but with several variations. (The numbers of the blocks in FIG. 2 that show identical functionalities are listed in parentheses.) The system receives the stamped image 104 and the corresponding verification key 105 from the server. The stamped image and the verification key are then processed in block 301 (201) to extract the embedded stamping information.

The extracted stamping information 302 (202) can be displayed to show ownership information on the computer display monitor in block 303. The displayed stamping information (in the form of a watermark image) can then be used for visual inspection in block 304 to determine whether the image has been altered wholly or partially. If the image is not altered, the stamping information can then be stored 305 for use at a later time so that it is possible to verify the image periodically after its reception, by comparing the stamping information stored after the first extraction 305 with the stamping information currently extracted 306 (203) to see if there is a match. If the comparison finds some discrepancy, the system can take the appropriate actions in block 307 (204) to guard against malicious acts.

In the verification process, the stamped source image and the verification key are processed to produce extracted stamping information in blocks 201 and 301. The extraction of the stamping information (e.g. the watermark image) from a stamped image is described here with reference to a mapping function called a "watermark extraction function". However, the process of stamping the source image is performed by applying the inverse of the mapping function used in the extraction process.

Figure 4:
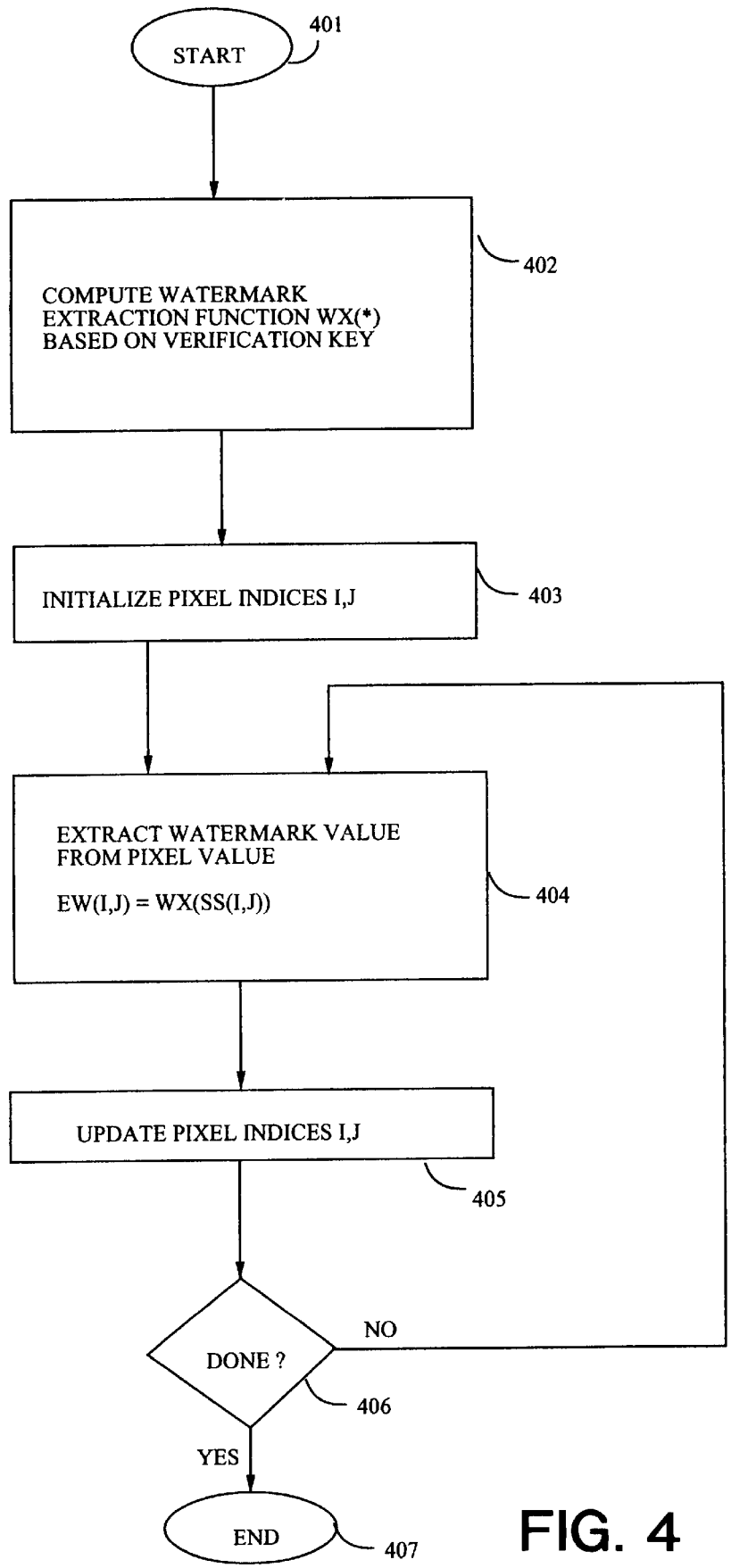
FIG. 4 is a flow chart showing a method to extract the embedded stamping information from a stamped image in the image verification processing.

The flow diagram of the preferred embodiment of extraction process shown in blocks 201 and 301 is illustrated in FIG. 4. The watermark image EW(I,J) is to be extracted from a stamped source image, SS(I,J). The processing begins 401 by computing the watermark extraction function, WX(*), from the verification key, in step 402, and initializing the pixel indices, I and J, to the indices of the first pixel to be processed in step 403.

The watermark extraction function is then applied to the pixel SS(I,J) to produce the extracted watermark at that pixel EW(I,J) in step 404:

$$EW(I,J)=WX(SS(I,J)).$$

The pixel indices are then incremented in step 405 to the indices of the next pixel to be processed, and the pixel indices are tested in step 406. If all pixels in the stamped-source image have been processed, then the watermark extraction process is complete in step 407; if all pixels in the stamped source image have not been processed, then the watermark extraction function is applied to the next pixel 404, the pixel indices are again updated 405, and the indices are again tested 406 to determine whether all pixels in the stamped source image have been processed.

Figure 10:
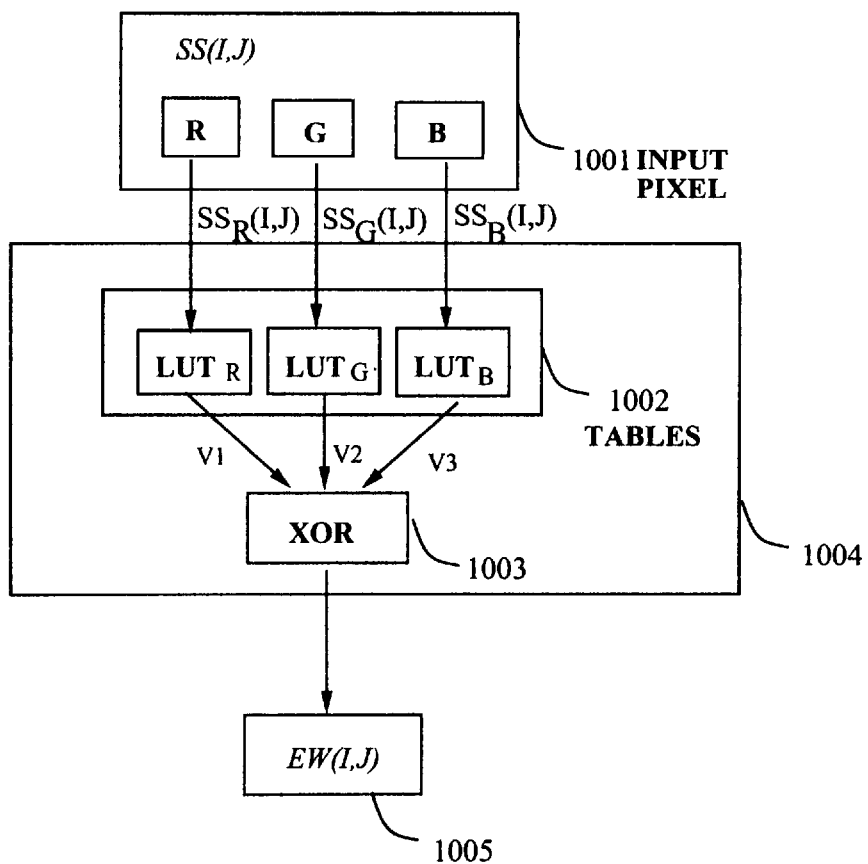
FIG. 10 is a block diagram illustrating the extraction of the watermark value from an input image pixel.

A preferred embodiment of the present invention which implements the watermark extraction function computation, step 402 and the watermark extraction process, step 404, are shown in FIG. 10. For a stamped color image SS(I,J), every pixel (I,J) in the image contains three color-component values showing the red, green and blue color intensities respectively, namely $SS_R(I,J)$, $SS_G(I,J)$ and $SS_B(I,J)$. For a monochrome stamped image, every pixel (I,J) desireably contains only one color intensity value, namely SS(I,J). The watermark extraction function WX(*) is a function computed based on the verification key in step 402. More formally, $$EW(I,J)=WX(SS_R(I,J),SS_G(I,J),SS_B(I,J))$$

where WX(*) can be a mapping function which can take an input value (that is, the pixel intensity value) into a binary output value, and the mapping function is given by the verification key.

In the preferred embodiment, a different mapping function is applied for each color intensity value of a pixel, and each mapping function for a single color component is called a color-component mapping function For a color image, a set of three color-component mapping functions are needed, namely $F_R(*)$, $F_G(*)$ and $F_B(*)$; and for monochrome image, one is needed, namely $F(*)$. In other words, $F(*)$, $F_R(*)$, $F_G(*)$ and $F_B(*)$ each can map an input value (the pixel intensity value) into a binary output value.

These different mapping functions are implemented in the form of binary look-up-tables (LUT's) in which the pixel value serves as the index to a table entry, and the table entry then gives a one-bit value ('0' or '1') output. In this case the verification key is related to a set of binary look-up-tables (LUTs) (three tables for color image and one table for monochrome image), and for the exemplary embodiment may be a number (we call this a seed) which can be fed into a known cyclic function generator to generate the set of binary LUT's.

Each binary LUT of the present exemplary embodiment is generated as follows. First, given an index, the table entry is either a '1' or a '0', which is determined in a random fashion. For example, a pseudo random number generator can be used to generate the table entries as arbitrary numbers having a random number distribution. As is known in the art, these pseudo random number generators employ a cyclic functions that receives an input number, called a "seed," and then recursively generate a random output value. In one embodiment of the present invention, the function subroutines srand() and rand() of the standard library of the C programming language are used. For each random output value, the table value is set as '0' if the random output value is even, and '1' if the random output value is odd. However, as would be apparent to one skilled in the art, the random table entries could be generated in any number of ways; for example, by using values generated by linear feedback shift registers, values from random number tables, or any other orthogonal function sequences.

The watermark extraction step 404 is illustrated in FIG. 10. Given a stamped image pixel SS(I,J) 1001, the intensity value of each color component, $SS_R(I,J)$, $SS_G(I,J)$ and $SS_B(I,J)$ respectively, serves as the index to the corresponding binary look-up-table (LUT), namely $LUT_R$, $LUT_G$ and $LUT_B$ (as shown in 1002) for Red, Green and Blue color respectively. The table entry of each index is read as the output. For each color, a one-bit output ('0' or '1') is obtained from the table, namely V1, V2 and V3. These three output bits then undergo the XOR (Exclusive OR Operator) operation 1003 to give the final desired watermark bit value EW(I,J) 1005 for the (I,J)th pixel. In mathematical terms, let the exclusive OR operator be represented by $\oplus$, $$EW(I,J)=LUT_R(SS_R(I,J))\oplus LUT_G(SSG(I,J))\oplus LUT_B(SS_B(I,J))$$

for a color stamped image (and EW(I,J)=LUT(SS(I,J)) for a monochrome image). For example, if an image pixel SS* has the color intensity values $$SS_R^* = 134, SS_G^* = 255, SS_B^* = 255;$$

and $$LUTR(134)=0, LUTG(255)=0, LUTB(255)=1;$$

then the extracted watermark value EW* of SS* becomes $$EW^* = 0 \oplus 0 \oplus 1 = 1.$$

In the above example the watermark extraction function WX(*) is the combination of the XOR function and the mapping functions given by the LUT's as shown in 1003. Many other possible mapping functions and combinations of mapping functions can be implemented as the watermark extraction function.

The comparison of extracted watermark values EW(I,J) and the watermark image values W(I,J) as shown in the blocks 203 and 306 can be accomplished automatically as follows: for each pixel (I,J), the absolute value difference between EW(I,J) and W(I,J) is recorded. For binary watermark values this can either be '0' if the two values match, or '1' if the two values do not match. The absolute value differences for all pixels are added up and if the sum exceeds a pre-defined threshold, then the stamped image is declared as having been altered. Other automatic comparison algorithms can also be implemented.

Invisible Image Stamping Processing

Figure 5:
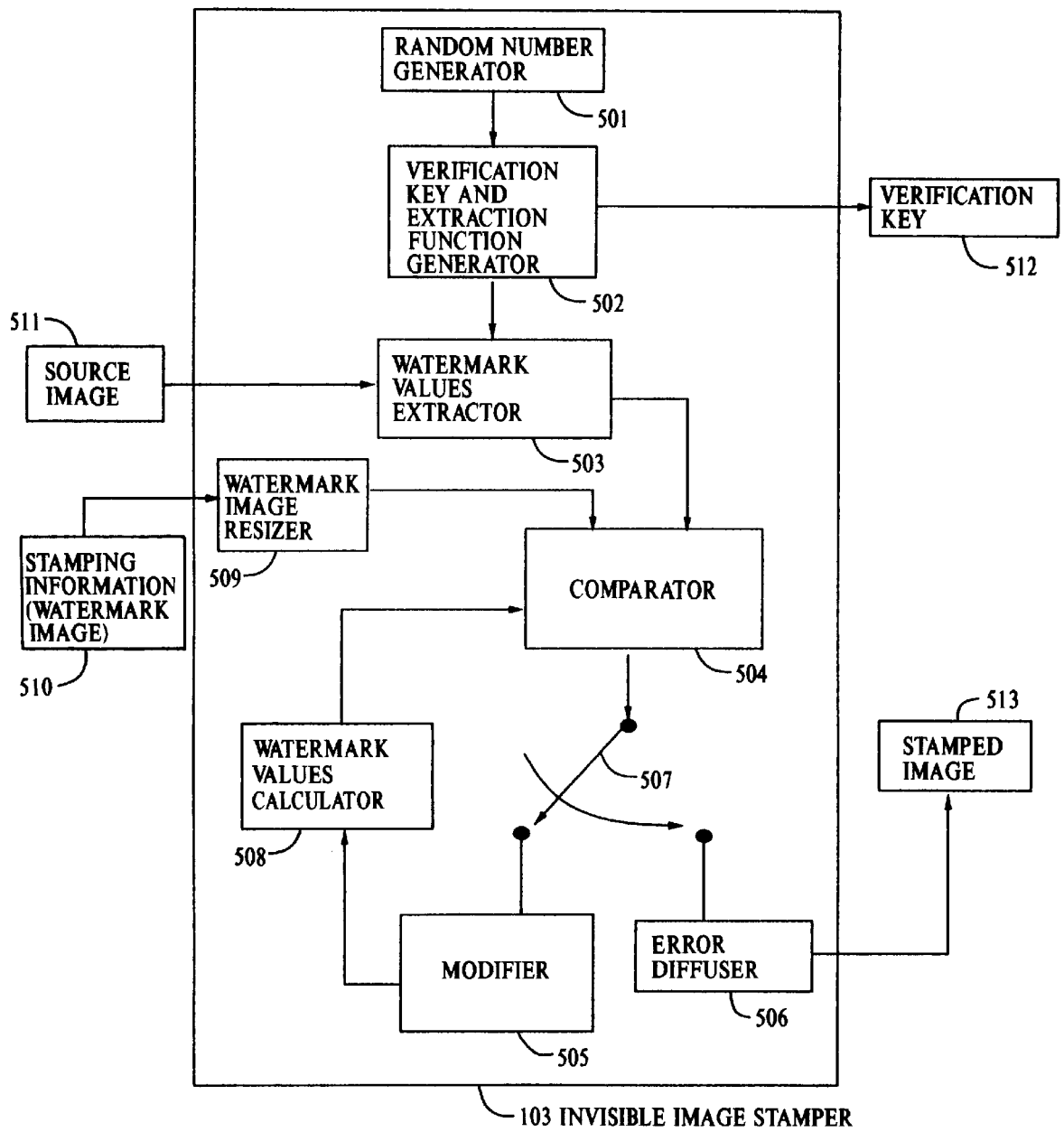
FIG. 5 is a functional level block diagram showing an embodiment of the invisible image stamping processing.
Figure 6:
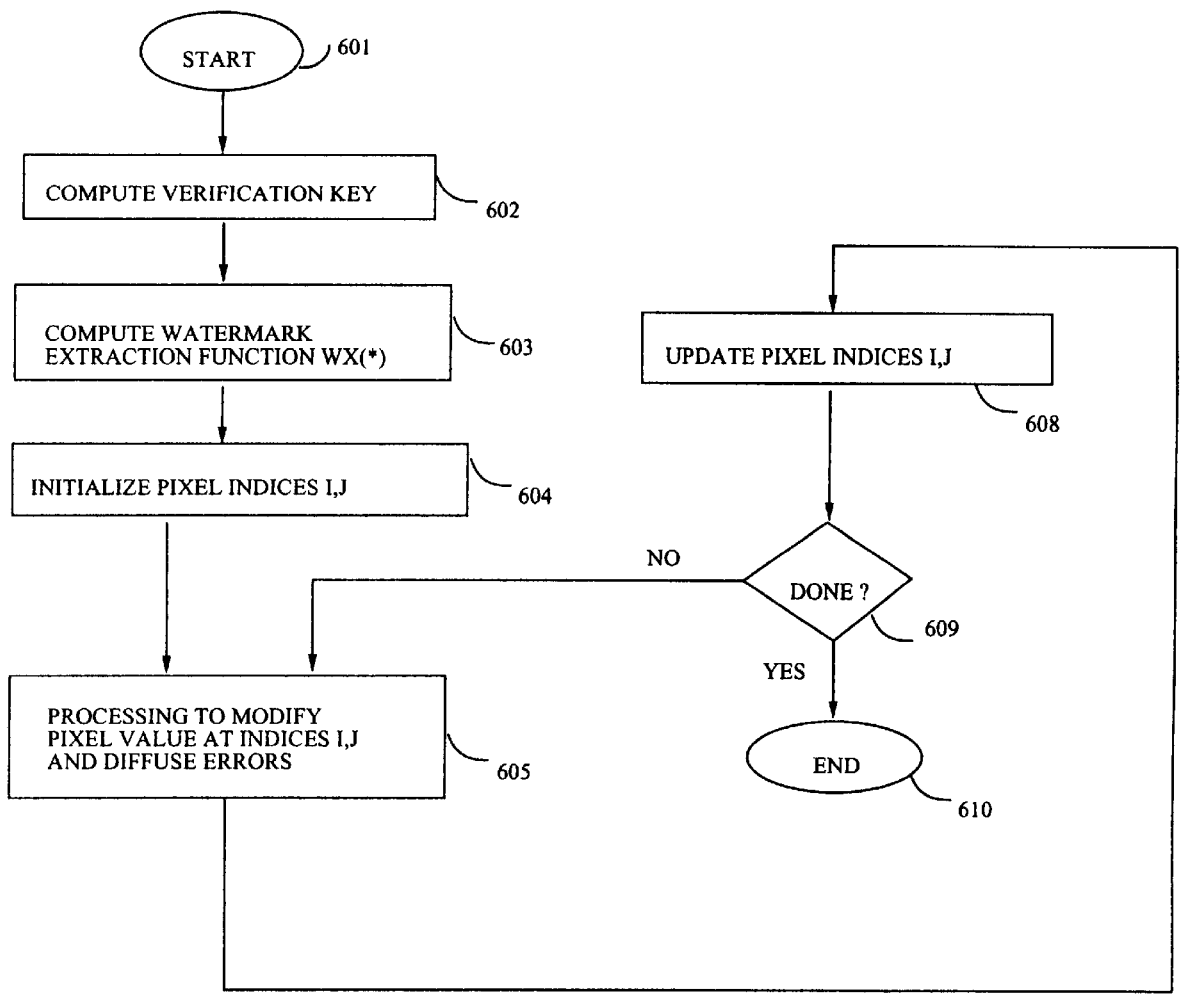
FIG. 6 is a flow chart showing the details of the invisible image stamping processing on the image pixels.
Figure 7:
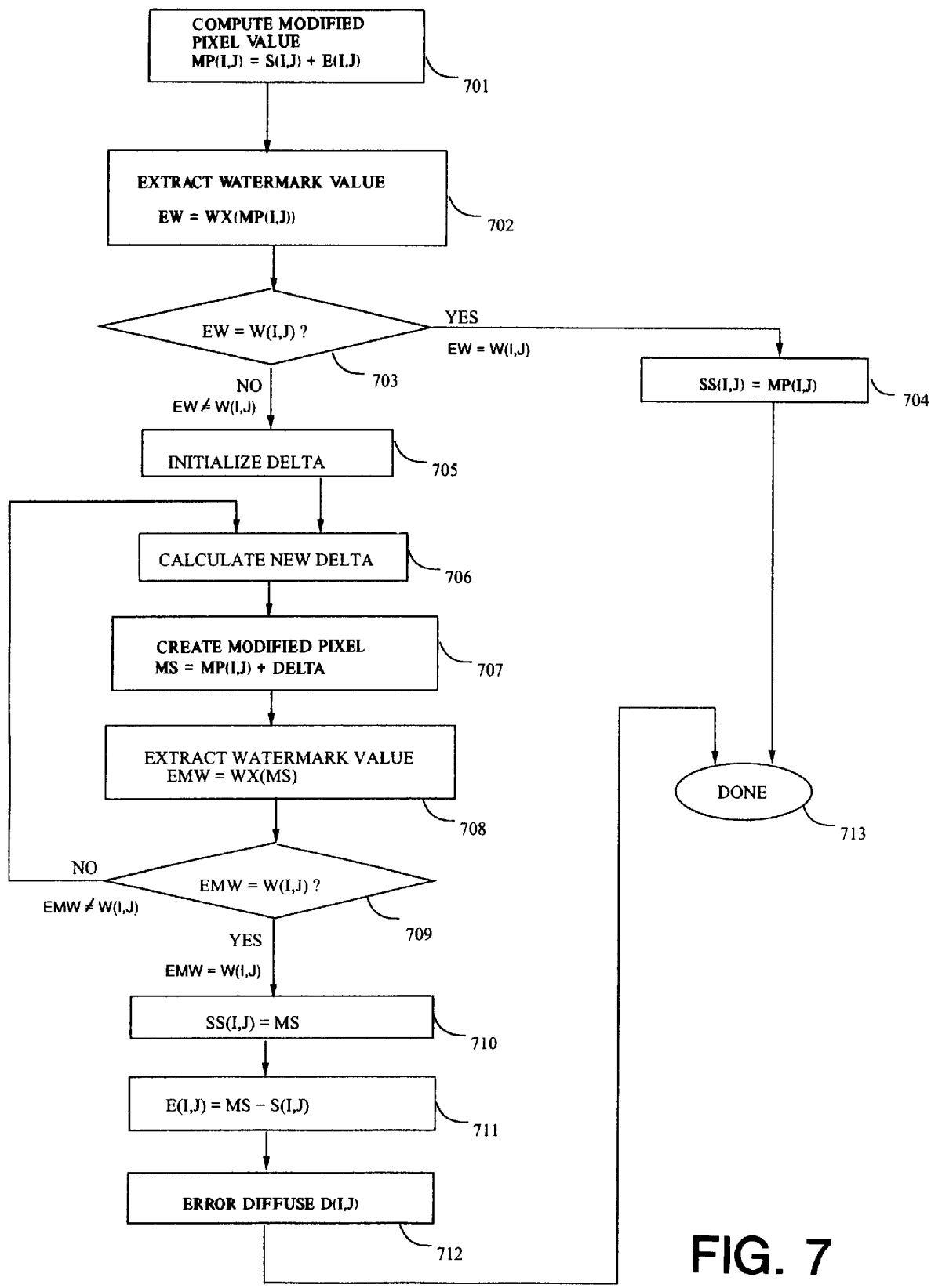
FIG. 7 is a flow chart showing the details of a method of processing to modify pixel values and error diffusion.

The functional level block diagram showing an embodiment of the invisible image stamping processing is illustrated in FIG. 5. This block diagram describes in detail the functional components of block 103 in FIG. 1. A flow diagram of the processing steps is shown in FIGS. 6 and 7 and the details will be presented in later sections.

At the top level, the process of embedding the stamping information in the form of a watermark image 510 into a source image 511, S(I,J), to produce a stamped source image 513, SS(I,J), and without incurring visible artifacts, consists of several major components, illustrated in blocks 502, 503, 505, 506 and 509.

To incorporate the capability of verifying a cropped portion of a stamped image, one embodiment of the present invention embeds the stamping information, the watermark image, onto at least one part, and potentially several parts, of the source image. In many applications the size of a watermark image is different from the source image, notably often much smaller. We thus have to resize the watermark image to the same size of the source image such that every pixel of the source image can embed the watermark information in block 509. In our preferred embodiment the resizing is achieved by replicating a watermark image which is smaller in size, both in the horizontal and vertical direction, to the size of the source image (the portion of replicated watermark image which is outside the boundary of the source image is then cropped out). The resized watermark image, which has the same size as the source image, is denoted W(I,J), and this resized image is then treated as the watermark image throughout the rest of the invention description.

The functional block 502 shows the generation of the verification key and a set of functions to extract the watermark value from a pixel such that the extraction process is secured without the proper key.

As described in block 402, in one preferred embodiment, the verification key can be a set of binary look-up-tables (LUT's), or can be a number and a known function generator of the number which can be used to generate the required set of binary LUT's. To produce the key, a random number generator 501 is used to generate randomly a sequence of numbers, each number can then be mapped through a known function to a bit value, and each bit value becomes one entry to the binary LUT's that serve as the verification key 512. Three binary LUT's are needed for a color source image, and one binary LUT for a monochrome source image. In another approach, the random number generator 501 can generate a seed number to serve as the key 512, and this number can be fed into a known cyclic function generator be used to reproduce the required binary LUT's.

As a set of binary look-up tables are generated randomly, there is the possibility that the table entries may contain many consecutive entries having the same value. This situation may result in adjusting pixel values to larger levels in the image stamping process to get the desired outpit bit value, which may cause undesireable artifacts in the stamped image. Therefore, another embodiment of the present invention restricts the number of consecutive entries having the same value to overcome the potentially large adjustment of a pixel value (and, consequently, the pixel's intensity). In this embodiment of the invention, the look-up tables are processed to restrict the number of consecutive table entry values to be small number. For the exemplary embodiment described the maximum allowable number of consecutive table entries is 4 or 5.

The binary LUT's serve as the binary mapping functions in the computation of watermark values of the source image pixel 511, namely S(I,J), as shown in block 503. The computation, or the extraction, of the watermark values is identical in the functionality to that of 404 in FIG. 4 that has been described in detail in the previous sections. The only difference is that the input is the source image pixel values S(I,J) instead of the stamped pixel values. For a color source image pixel S(I,J), the three color components values of red, green and blue are denoted by $S_R(I,J)$, $S_G(I,J)$ and $S_B(I,J)$ respectively, and the set of three mapping functions provided by the three LUT's are $LUT_R(*)$, $LUT_G(*)$ and $LUT_B(*)$ respectively. For a monochrome image, the pixel intensity value is denoted by S(I,J), and the mapping function provided by the binary LUT be LUT(*). The watermark extraction function WX(*) is a function of the mapping functions. For each pixel (I,J), the extracted watermark value EW(I,J) is computed as follows: let $\oplus$ be the XOR operator, $$EW(I,J) = LUT_R(S_R(I,J)) \oplus LUT_G(S_G(I,J)) \oplus LUT_B(S_B(I,J))$$

for a color source image and EW(I,J)=LUT(S(I,J)) for a monochrome image.

The computed watermark value of a source image pixel is then compared with the desired value in the resized watermark image W(I,J), in the comparison process as shown in block 504 to see if the values match or not.

The gateway 507 controls the implementation of the iteration process of the pixel modification, which has two subparts. In the first subpart, in step 505, each source image pixel value is altered such that the computed watermark value is forced to match the desired value in the corresponding pixel in the watermark image, if no match of the watermark values is found at the first testing. For the pixel alteration, the errors introduced by the modification cannot produce visible artifacts in the stamped image so the errors are introduced at predetermined slowly increasing levels in order to alter the image pixel intensity values gradually. Therefore, the process of pixel modification may take several iterations. The watermark value of the altered pixel is recomputed in block 508 with each new error adjustment iteration to check if the re-computed value matches the desired value in block 504. In the second subpart, once the computed watermark value matches the desired watermark value, then the iteration stops and the errors introduced in the pixel-value alteration step are then diffused in block 506 to neighboring pixels in such a way to maintain a constant average color intensity values in the neighboring pixels.

In one preferred embodiment, for a color image pixel, the three color values of the pixel are altered. The pixel values have to be modified in a way such that the distortions are minimal. Any color intensity value can be modified at a given iteration. The level of adjustment starts from +1 or −1 and gradually increases in magnitude in subsequent iterations. Book-keeping of the current level of adjustments in each color component is used to ensure that the magnitude of level change increases gradually. The maximum level of adjustment is controlled to ensure the alteration does not lead to significant difference in visual quality of the image.

The selection of color to be altered at a given iteration can be achieved by using predefined tables or by incorporating random number generators in the selection process. The advantage of using random number generators is that the modifications are spread out to all the three colors instead of concentrating at a particular color for a majority of the pixels. The effect is especially prominent in the encoding of synthetic images in which a large area may be of uniform intensity values. A systematic scheme in the selection of pixels to modify can lead to the concentration of alteration in one particular color component in an image and is thus less desirable. The selection of signs (+ or −) of level adjustment is also made random at each pixel to smooth out the errors produced locally.

For a monochrome image, the pixel alternation is a straight forward adaptation of the method used in the alternation of color pixels: the gradual adjustments of the pixel values are confined to one intensity component instead of the three color components.

The errors produced by the pixel value alteration described above are then diffused as shown in block 506, so that the average image intensity values are preserved; this produces the proper average color as the errors are diffused locally over an image to smooth out the alterations.

Error diffusion is commonly used for smoothing the transitions of colors around neighboring pixels in the conversion of true colors to limited color palettes. The process produces good quality color images by adding natural texture and color transitions in place of sudden changes. Error diffusion is employed for similar reasons in the encoding unit such that the errors produced by altering the pixel values (which is equivalent to the quantization errors in the color conversion process) will spread to neighboring pixels. This method enables retention of the proper average color and eliminates unwanted local artifacts. The present invention includes an adaptation of the error diffusion process described previously which is adapted for the specific purposes of the invention.

E(I,J) is defined as the diffused error for a given color of the pixel (I,J). E(I,J) is initialized to 0 for all (I,J). For every pixel (I,J), the error diffusion processing steps are as follows:

1. The current modified pixel value, MP(I,J), is the sum of the source image pixel value S(I,J) and the value of the diffused error at the pixel location. That is, $$MP(I,J)=S(I,J)+E(I,J). \quad (1)$$

2. The output pixel value, SS(I,J), is the altered and modified pixel value which gives the bit output matching the desired watermark values.

3. The output error, D(I,J), is computed as the difference between the current modified pixel value and that of the output pixel value:

$$D(I,J)=P(I,J)-SS(I,J). \quad (2)$$

4. At neighboring pixel locations not yet processed, the diffused errors are adjusted by the amounts that are proportional to the output error at the current location. Therefore, for some (R,S), $$E(I+R,J+S) \leftarrow E(I+R,J+S)+C(R,S)D(I,J). \quad (3)$$

Combining equations (1) and (2), we get $$SS(I,J)=MP(I,J)-D(I,J)=S(I,J)+E(I,J)-D(I,J). \quad (4)$$

By restricting the sum of diffusion coefficients $\Sigma_{r,s} C(R,S) =1$, we have $\Sigma E(I,J)=\Sigma D(I,J)$. Summing (4) over all (I,J), results in $$\Sigma SS(I,J)=\Sigma S(I,J). \quad (5)$$

This guarantees that the average intensity values will be preserved and the proper average color is produced. For the three colors RGB, the error diffusion process in each color is carried out independently, in other words, the same formulation can be applied to the red (R), green (G) and blue (B) intensity values. The errors can also be diffused using a variation of the coupled-color error diffusion process.

In our preferred embodiment, the following diffusion coefficients are used:

$$C(R,S) = \begin{cases} 0.5, (R,S) = (1,0), \\ \phantom{0.5,} (0,1); \\ 0, \text{else.} \end{cases} \quad (6)$$

For a monochrome image, the diffusion of errors is confined to the intensity value of the image and can be readily adapted from the scheme described above.

When the stamping processing is completed, a stamped image 513 is produced as the output and incorporates the stamping information in its pixel values. In addition to the output stamped image 513, a verification key 512 is produced in the process for the subsequent image verification processing purposes.

A flow chart of the image stamping process of this invention is given in FIG. 6. The image stamping processing begins at step 601 by computing the verification key at step 602, computing the watermark extraction function at step 603, namely WX(*), and initializing the the indices, I and J, for the pixel to be processed at step 604. The pixel at location (I,J) is then processed in the step 605 which is an iterative processing to modify pixel value at location (I,J) by introducing errors, and to diffuse the errors to neighboring pixels. This step is illustrated in more detail in FIG. 7. The pixel indices (I,J) are incremented to the indices of the next pixel to be processed in step 608, and a test is performed to determine whether the entire source image has been processed in step 609. If the entire source image has been processed, the image stamping processing is complete at step 601; otherwise the processing proceeds with the next pixel to step 605.

FIG. 7 shows the flow diagram of the process described by step 605. Given a source image pixel S(I,J) and the error value E(I,J), compute the modified pixel value MP(I,J) in step 701. A watermark value is extracted from pixel MP(I,J) using the watermark extraction function in step 702. The value, EW, is then tested to determine whether it is equal to the value of the watermark to be embedded, W(I,J), in step 703.

If the values EW and W(I,J) agree, the value of the output pixel, SS(I,J), is set to be equal to S(I,J) in step 704. The stamping processing of this pixel at location (1,J) is completed 713.

If the values EW and W(I,J) do not agree, the processing proceeds to initialize the DELTA calculator 705, calculate a new value of DELTA in step 706, create an altered and modified pixel value, MS, in step 707, and extract the watermark value, EMW, from MS in step 708. EMW is then tested to determine whether it is equal to W(I,J) in step 709.

If the values EMW and W(I,J) are equal, the value of the output pixel is set to the value of MS in step 710, the difference between MP(I,J) and MS is calculated in step 711. The difference is the error to be diffused in step 712. The stamping processing of the image pixel at location (I,J) is done in step 713.

If the values EMW and W(I,J) are not equal, a new value of DELTA is computed by going back to step 706, a new value of MS is computed in 707, a new value of EMW is computed in step 708, and EMW and W(I,J) are again tested for equality in step 709.

The difference D(I,J) is the error to be diffused to neighboring pixels not yet processed. The diffused error E for the neighboring pixels at (I,J+1) and (I+1,J) are:

$$E(I,J+1)=C(0,1)D(I,J)$$

$$E(I+1,J)=C(1,0)D(I,J)$$

For the preferred embodiment, C(0,1) and C(1,0) is equivalent to 0.5. The following describes an example of the process of one embodiment of the present invention. Given an image pixel S* with color intensity values $$(S^*_R, S^*_G, S^*_B)=S^*$$

and with an error vector E* at this same pixel position with color intensity values:

$$(E^*_R, E^*_G, E^*_B)=E^*$$

then if:

$$S^*_R=119, S^*_G=11, S^*_B=250;$$

$$E^*_R=1, E^*_G=-1, E^*_B=0;$$

and, $$LUT_R(119)=0, LUT_R(120)=0, LUT_R(121)=0;$$

$$LUT_G(9)=0, LUT_G(10)=0, LUT_G(11)=1;$$

$$LUT_B(249)=0, LUT_B(250)=1, LUT_B(251)=1;$$

then $$MP^*=S^*+E^*=(120, 10, 250);$$

and the extracted watermark value at MP* is:

$$EW^*=WX(MP^*)=0\oplus 0\oplus 1=1.$$

If the desired watermark value W* is 0, that is, EW*≠W*, then MP* is modified. First DELTA is initialized to (0,0,0). Then a new DELTA is calculated. If DELTA=(1,0,0). The modified pixel value becomes $$MS=MP^*+DELTA=(121, 10, 250).$$

$$EMW=WX(MS)=0\oplus 0\oplus 1=1.$$

Since EWX≠W*, the iteration continues. A new DELTA is calculated, say DELTA=(0,1,0), $$MS=MP^*+DELTA=(120, 11, 250).$$

$$EMW=WX(MS)=0\oplus 1\oplus 1=0.$$

Now EMW matches W*, so SS* is set to the value of MP* and the output error D*, in this example (0, −1, 0), is then diffused to the neighboring pixels. If EMW does not match W*, then a new DELTA will be computed and the iteration continues.

Image Stamping and Verification on JPEG-compressed Images

The apparatus and method of the exemplary embodiment of the invention can also be used to mark JPEG-compressed images. Each image to be compressed, or input image, is assumed to be composed of pixels, each of of which may consist of several color components. For example, each pixel might consist of three color components: one red, one green, and one blue. We denote the value of the C'th color component of the input-image pixel in the i'th row and j'th column as P(C,i,j). For a single color component C, the image P(C,i,j) will be called the C'th color plane of the input image. We shall briefly review the JPEG compression and summarize the processing steps to add stamping information to a JPEG compressed image and subsequently verify its content.

In its baseline form, JPEG decomposes each color-plane of an image into non-overlapping blocks, 8 by 8 pixels in size, arranged in rows and columns. If M is used to denote the M'th row of blocks, N is used to denote the N'th column of blocks, m is used to denote the m'th row of pixels within a block, n is used to denote the n'th column of pixels within a block, and b(C,M,N,m,n) is the (m,n)'th pixel of the (M,N)'th block of the C'th color plane, then $$b(C,M,N,m,n)=P(C,8^*M+m,8^*N+n), \text{ for } 0\leq m<9, 0\leq n<9.$$

JPEG then transforms the 64 values within a block using a discrete cosine transform; 64 transform coefficients, arranged as an 8 by 8 block, are produced. Following the discrete-cosine transform, JPEG compression entails a processing step in which each of the coefficients is divided by a scalar and the result quantized to an integer value. In a later JPEG processing step, the quantized transform coefficients are coded using Huffman coding.

Denoting B(C,M,N,p,q) as the block of the discrete-cosine-transform coefficients produced by transforming block b(C,M,N,m,n), the dc coefficient of the block, B(C,M,N,0,0), is the average of the 64 values of the (M,N)'th block of the Cth color plane. From the dc-coefficients, define the dc-coefficient image, BD(C,M,N) as

BD(C,M,N)=B(C,M,N,0,0).

Figure 11:
FIG. 11 is an example of a sample image.
Figure 12:
FIG. 12 is an example of a dc-coefficient image of the image shown in FIG. 11.

The dc-coefficient image is one-eighth the size of the input image in each dimension. A sample image is given in FIG. 11; the dc-coefficient image produced from its green color-plane is given in FIG. 12.

To mark a JPEG image with the method of this invention, the exemplary embodiment of the present invention inserts stamping information and performs processing after JPEG computes the dc-coefficient values. This processing marks one or more of the dc-coefficient images exactly as the method would mark an uncompressed image. Subsequent to this marking, the JPEG processing proceeds to quantize and entropy-code the cosine-transform coefficients, as usual.

According to one exemplary embodiments the multiple dc-coefficient values for the several dc-coefficient images at the same position (M,N) are treated as several color values associated with a single pixel in a multi-color dc-coefficient image; for this case, the marking is identical to the marking of an uncompressed multi-color image with the same several number of colors. In other exemplary embodiments, one or more of the dc-coefficients images are marked independently of the dc-coefficient images of the other color planes.

Figure 8:
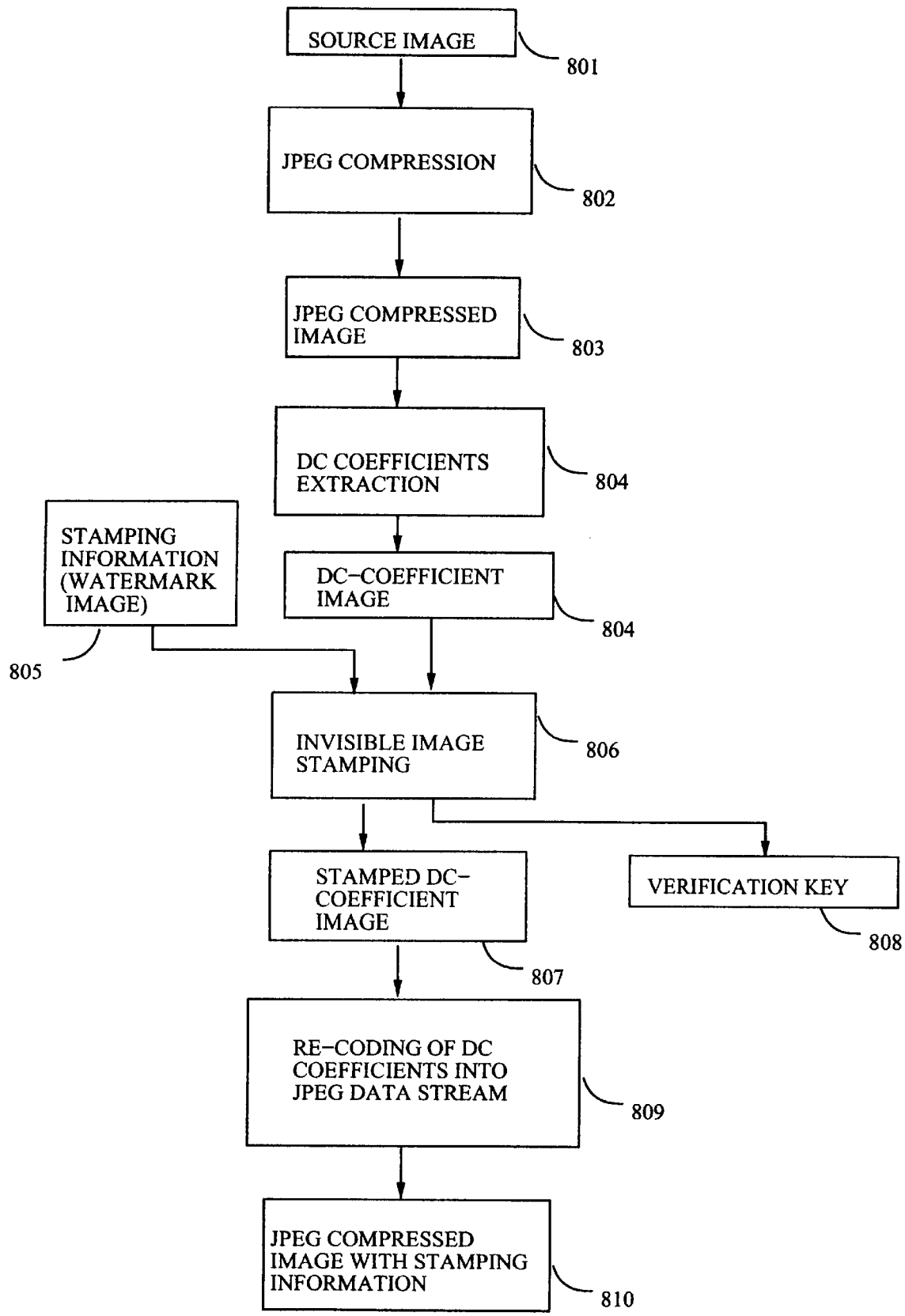
FIG. 8 is a functional level block diagram showing the invisible image stamping processing on a source image in the JPEG compression format.

FIG. 8 is a functional level block diagram showing the preferred embodiment to achieve the invisible image stamping processing on a source image in the JPEG compression format. For a source image 801, it can undergo JPEG compression 802 and be encoded into a data bit stream conformed with the JPEG standard which we call a JPEG compressed image 803. From 803, the dc coefficients are obtained directly from the bit stream, in block 804. The dc coefficients are coded differently and separately from the ac coefficients in JPEG standard. A dc-coefficient image 805 is formed by combining the dc coefficients extracted. The dc image is an iconic version of the original image, and is ⅛ of the size in each dimension if 8×8 blocks are used in the JPEG compression. The dc image is then treated as the input source image into the fore-mentioned image stamping processing 807 (103), together with the stamping watermark image 806 which is of the same size as the dc-coefficient image. A verification key 809 is also produced. A stamped dc-coefficient image is produced 808 from the stamping process, and the pixel values in the dc image are changed to embed the watermark information. This means that the dc coefficients of the compressed image 804 are changed accordingly. The modified dc coefficients are re-coded and integrated in block 810 into the JPEG data stream to produce a stamped JPEG compressed image 811.

Figure 9:
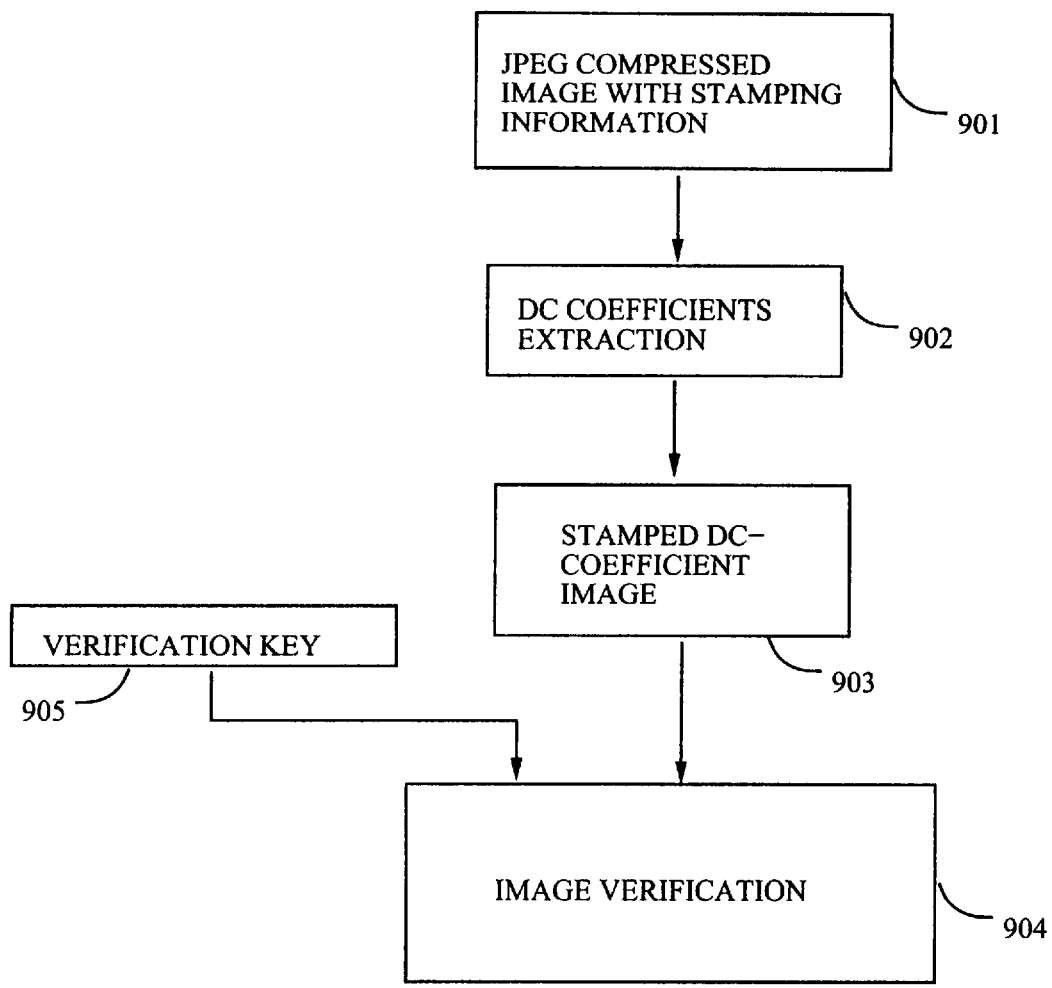
FIG. 9 is a functional level block diagram showing the image verification processing on a stamped image in the JPEG compression format.

FIG. 9 is a functional level block diagram showing the image verification processing on a stamped image in the JPEG compression format. The input image is a stamped JPEG compressed image with the watermark information embedded in its dc coefficients 901. Since the data stream of this stamped image is conformed to JPEG standard, the dc coefficients are extracted directly from the data stream in block 902 which is similar to block 903 in FIG. 9, to produce the dc-coefficient image which contains the stamping information 903. This stamped dc-coefficient image is used as the input, together with the corresponding verification key 905, to the image verification processing in block 904.

For the above schemes, in the variations of JPEG schemes where there is a subsampling of the chrominance values, the embedding of the watermark image and its subsequent extraction for verification use is confined to the luminance pixel values.

One major desired feature of the above exemplary embodiments is that image verification and stamping can be achieved directly from processing on JPEG compressed image without having to first decompress the compressed image and then verify the content. The other is that by embedding information directly into JPEG data stream, the watermark information will not be lost in the JPEG compression process because the quantization operation in JPEG compression is likely to alter most pixel values, thus rendering a significant loss in the embedded watermark information.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. An apparatus for stamping and verifying a source image with stamping information in which the source image has a plurality of source image values, the apparatus comprising:
   image stamping means for producing a stamped image by:
   (a) forming a verification key from a seed value and a mapping function, the seed and the mapping function corresponding to at least one look-up table (LUT);
   b) mapping, according to the mapping function and the at least one LUT, each of the plurality of the source image values to form a respective extracted value; and
   c) altering selected ones of the plurality of source image values whose extracted value does not match a corresponding portion of the stamping information to produce a respective altered source image value having an altered extracted value equivalent to the corresponding portion of the stamping information; and
   image extracting means for receiving the stamped image, for using the verification key to extract the stamping information in accordance with the mapping function, and for providing extracted stamping information; and
   signaling means for signaling that there is a corruption to the stamped image if the stamping information and the extracted stamping information are not substantially equivalent.

2. The image verification apparatus as recited in claim 1, wherein the verification key includes a seed value and the image stamping means further includes table generating means for generating each entry of the at least one LUT using a random number generator and the seed value.

3. The image verification apparatus as recited in claim 1, wherein the stamping information is a watermark image.

4. The image verification apparatus as recited in claim 3, wherein the source image is formed of a plurality of source pixel values and the watermark image is formed of a plurality of watermark image pixel values.

5. The image verification apparatus as recited in claim 4, wherein:
   the image stamping means further includes means for determining an order in which each of the plurality of source pixel values are to be addressed; and error diffusion means comprising:

means for identifying one source pixel and a corresponding modified pixel in the source image, the modified pixel including an error value;

means for determining an amount of modified pixel error defined as the difference between the value of the modified pixel, including the error value, and value of the corresponding pixel in the stamped source image; and means for error-diffusing the modified pixel error by providing means to adjust successive adjacent source pixel values away from the identified source pixel with decreasing amounts of modified pixel error, such that the total amount of the adjustment in the adjacent pixel values is equivalent to the modified pixel error.

6. The image verification apparatus as recited in claim 1, the image stamping means further including:

means for stamping the verification key with the stamped image; and the image extracting means further includes means to extract the verification key from the stamped image.

7. The image verification apparatus as recited in claim 1, the signaling means further comprising:

means for storing the stamped information and the extracted stamping information;

means for comparing the stamped information and the extracted stamping information to produce comparison information; and means for detecting the corruption to the extracted source image from the comparison information and for indicating at least one region of the extracted source image corresponding to the corruption.

8. The image verification apparatus as recited in claim 1, wherein the stamped image is one of a plurality of stamped images stored in a first memory, and each of the plurality of stamped images has a corresponding verification key, each verification key being one of the plurality of keys, stored in a second memory.

9. The image verification apparatus as recited in claim 8, the apparatus further comprising:

means for selecting the stamped image from the plurality of stamped images in the first memory; and means to retrieve the verification key corresponding to the stamped image from the plurality of keys stored in the second memory.

10. The image verification apparatus as recited in claim 9, further comprising:

image integrity verification means for verifying the integrity of each of the plurality of stamped images in the first memory, the image integrity verification means repetitively: 1) selecting each one of the plurality of stamped images and the corresponding verification key, 2) extracting the stamping information from the stamped image based on the corresponding verification key; and 3) verifying the integrity of the stamped image by verifying the stamping information with the verification key.

11. A system for stamping a source image with stamping information in which the source image has a plurality of source image values comprising:

forming means for forming a verification key from a seed value and a mapping function, the seed and the mapping function corresponding to at least one look-up table (LUT);

mapping means for mapping, according to the mapping function and the at least one LUT, each of the plurality of the source image values to form a respective extracted value; and pixel alteration means for altering selected ones of the plurality of source image values whose extracted value does not match a corresponding portion of the stamping information to produce a respective altered source image value having an altered extracted value equivalent to the corresponding portion of the stamping information.

12. The image stamping system as recited in claim 11, wherein the plurality of the source image values is a plurality of source pixel values and the stamping information is a watermark image formed of a plurality of watermark image pixel values.

13. A system for stamping and verifying a source image with stamping information in which the source image is represented by a plurality of frequency-domain coefficient values, the system comprising:

image stamping means for producing a stamped image by:

(a) forming a verification key from a seed value and a mapping function, the seed and the mapping function corresponding to at least one look-up table (LUT);

b) mapping, according to the mapping function and the at least one LUT, each of the plurality of frequency-domain coefficient values to form a respective extracted value; and c) altering selected ones of the frequency-domain coefficient values whose extracted value does not match a corresponding portion of the stamping information to produce a respective altered frequency-domain coefficient value having an altered extracted value equivalent to the corresponding portion of the stamping information;

image extracting means for receiving the stamped image, for using the verification key to extract the stamping information from the portion of the plurality of frequency-domain coefficient values in accordance with the mapping function and the LUT, and for providing extracted stamping information; and signaling means for signaling that there is a corruption to the extracted source image if the stamping information and the extracted stamping information are not substantially equivalent.

14. The image verification apparatus as recited in claim 13, wherein the plurality of the frequency-domain coefficient values is formed by a frequency-domain transform operation on the source image represented by a plurality of source image pixel values.

15. The image verification system as recited in claim 14, wherein the transform operation on the source image pixel values is a discrete cosine transform (DCT) and the portion of the plurality of the frequency-domain coefficient values includes the dc coefficients of the DCT transformed plurality of source image pixel values.

16. The image verification system as recited in claim 13, wherein the stamping information is a a watermark image.

17. A system for stamping a source image with stamping information in which the source image is represented by a plurality of frequency-domain coefficient values, the system comprising:

stamping means for generating a verification key from a seed value and a mapping function, the seed and the mapping function corresponding to at least one look-up table (LUT);

mapping means for mapping, according to the mapping function and the at least one LUT, each of a portion of the plurality of frequency-domain coefficient values to form a corresponding extracted value; and means for modifying selected ones of the portion of the plurality of frequency-domain coefficient values whose extracted value does not match a corresponding portion of the stamping information to produce a respective modified frequency-domain coefficient value having a modified extracted value equivalent to the corresponding portion of the stamping information.

18. The image verification system as recited in claim 17, wherein the stamping information is a watermark image which is formed as a plurality of watermark image values.

19. The image verification system as recited in claim 18, wherein the plurality of frequency-domain coefficient values are a set of discrete cosine (DCT) transform coefficient values of the source image and the portion of the plurality of frequency-domain coefficient values includes the dc coefficients of the set of DCT transform coefficient values.

20. A method of stamping and verifying a source image with stamping information in which the source image has a plurality of source image values, the method comprising the steps of:

(a) forming a verification key from a seed value and a mapping function, the seed and the mapping function corresponding to at least one lookup table (LUT);

(b) mapping, according to the mapping function and the at least one LUT, each of the plurality of the source image values to form a respective extracted value;

(c) altering selected ones of the plurality of source image values whose extracted value does not match a corresponding portion of the stamping information to produce a respective altered source image value having an altered extracted value equivalent to the corresponding portion of the stamping information;

d) extracting the stamping information in accordance with the mapping function and the at least one LUT defined by the verification key;

e) providing extracted stamping information; and f) signaling that there is a corruption to the extracted source image if the stamping information and the extracted stamping information are not substantially equivalent.

21. A method of stamping a source image with stamping information in which the source image has a plurality of source image values comprising the steps of:

(a) forming a verification key from a seed value and a mapping function, the seed and the mapping function corresponding to at least one lookup table (LUT);

(b) mapping, according to the mapping function and the LUT, each of the plurality of the source image values to form a respective extracted value; and (c) modifying selected ones of the plurality of source image values whose extracted value does not match a corresponding portion of the stamping information to produce a respective modified source image value having a modified extracted value equivalent to the corresponding portion of the stamping information.

22. The image stamping method as recited in claim 21, wherein the plurality of the source image values is a plurality of source pixel values and the stamping information is a watermark image formed as a plurality of watermark image pixel values, wherein the mapping step a) further comprises the step of:

a)(1) embedding the watermark image into the source image by setting each source pixel value to a corresponding one of the stamped image values according to the mapping function, the at least one LUT, and the corresponding one of the plurality of watermark image pixel values.

23. A method of providing an error-diffused stamped image, the stamped image being a source image defined by a plurality of source pixel values, each stamped with stamping information to form a corresponding modified pixel, comprising the steps of:

a) identifying one source pixel and a corresponding modified pixel in the source image, the modified pixel including an error value;

b) determining an amount of modified pixel error defined as the difference between the value of the modified pixel, including the error value, and value of the corresponding pixel in the stamped source image; and c) error-diffusing the modified pixel error by adjusting successive adjacent source pixel values away from the identified source pixel with decreasing amounts of the modified pixel error, in which the corresponding modified pixel of each adjacent source pixel is altered such that the total amount of the adjustment in the adjacent pixel values is equivalent to the modified pixel error, and wherein the modified pixel value has incorporated the stamping information, and the adjacent altered pixel values have not yet incorporated the desired stamping information, which are further modified to incorporate appropriate stamping information in subsequent stamping processing.

24. A method of providing an error-diffused stamped image, the stamped image being a source image defined by a plurality of source pixel values, each stamped with stamping information to form a corresponding modified pixel, comprising the steps of:

a) identifying one source pixel value and a corresponding modified pixel value in the stamped image, the source pixel value including an error value;

b) determining an amount of modified pixel error defined as the difference between the source pixel value including the error value and the corresponding modified pixel value; and c) error-diffusing the modified pixel error by adjusting successive adjacent source pixel values away from the identified source pixel with decreasing amounts of the modified pixel error by altering the corresponding modified pixel of each adjacent source pixel, wherein i) each altered modified pixel and ii) the modified pixel have a substantially similar portion of the stamping information as the modified pixel value.

25. The method of providing an error-diffused stamped image as recited in claim 24, further comprising the step of:

d) repeating steps a) through d) until all source pixel values are identified and error-diffused to provide the error-diffused stamped image.

26. A system for stamping a source image with stamping information in which the source image is represented by a plurality of source image pixels and in which the stamping information is a plurality of stamping values, comprising:

means for generating at least one look-up table (LUT) based upon a verification key; and means for applying a mapping function corresponding to the at least one LUT to each source image pixel and for altering each source pixel such that the output value of the mapping function corresponds to a corresponding one of the plurality of stamping values.

27. A system for extracting stamping information from a stamped source image having stamping information in which the stamped source image is represented by a plurality of stamped source image pixels and in which the stamping information is a plurality of stamping values, comprising:

table generating means for generating at least one look-up table (LUT) based upon a verification key; and means for applying a mapping function corresponding to the at least one LUT to each stamped source image pixel such that the output value of the mapping function extracts a corresponding one of the plurality of stamping values.

28. The system for extracting stamping information from a stamped source image as recited in claim 27, wherein the verification key contains a seed value and the table generating means generates each entry of the at least one LUT by using a random number generator employing the seed value.

* * * * *